United States Patent [19]

Luise

[11] Patent Number: 4,668,415
[45] Date of Patent: May 26, 1987

[54] FACILITATION OF ORIENTATION OF THERMOTROPIC POLYMERS IN A MAGNETIC FIELD

[75] Inventor: Robert R. Luise, Boothwyn, Pa.

[73] Assignee: E. I. Du Pont de Nemours and Company, Wilmington, Del.

[21] Appl. No.: 828,642

[22] Filed: Feb. 12, 1986

[51] Int. Cl.⁴ ............................................... H01F 1/00
[52] U.S. Cl. ................................ 252/62.54; 252/62.53
[58] Field of Search ........................... 252/62.54, 62.53

[56] References Cited

U.S. PATENT DOCUMENTS

| | | | |
|---|---|---|---|
| 3,889,039 | 6/1985 | Wainer | 252/62.54 |
| 4,327,346 | 4/1982 | Tada et al. | 252/62.54 |
| 4,363,850 | 12/1982 | Yasul et al. | 252/62.54 |
| 4,404,253 | 9/1983 | Kohler et al. | 252/62.54 |

FOREIGN PATENT DOCUMENTS

| | | |
|---|---|---|
| 0142297 | 5/1985 | European Pat. Off. . |
| 2143315 | 2/1973 | France . |
| 2462725 | 2/1981 | France . |
| 2544731 | 10/1984 | France . |
| 59-116410 | 7/1984 | Japan . |

OTHER PUBLICATIONS

Physical Review Letters, 51, N. 25 (1983), pp. 2298–2301.

*Primary Examiner*—Arthur P. Demers

[57] ABSTRACT

Use of magnetic particles coated with a dispersant to facilitate orientation of anisotropic melt-forming polymers in a magnetic field.

9 Claims, 1 Drawing Figure

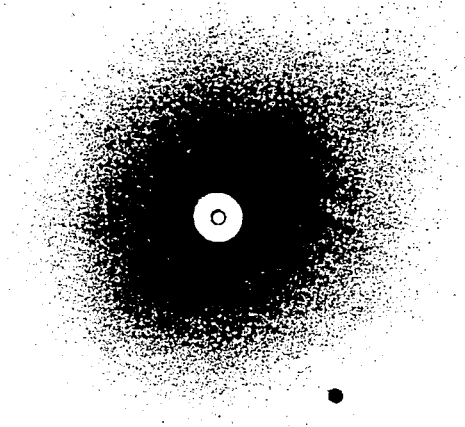

FACILITATION OF ORIENTATION OF THERMOTROPIC POLYMERS IN A MAGNETIC FIELD

BACKGROUND OF THE INVENTION

The present invention relates to the facilitation of orientation of thermotropic polymers in a magnetic field through the use of a dispersion of magnetic particles.

It is well established that both monomeric and polymeric liquid crystals are orientable in magnetic fields. See "Polymer Liquid Crystals", A. Cifferis et al., Academic press, 1982, pp. 275-308 and "The Physics of Liquid Crystals" Oxford Press 1975). High field strengths, on the order of $10^3$-$10^4$ Gauss, are normally required, however, restricting practical application.

The use of magnetic particles to facilitate orientation of monomeric liquid crystals of both the lyotropic (solution) and thermotropic variety has recently been reported. (See French Pat. App. 2462725, 1981, and Phys. Rev. Letters, 51, N. 25, 1983, p. 2298). In the latter work, a dispersion of elongated magnetic particles was utilized to substantially reduce the magnetic field strength required to orient the liquid crystal. This behavior has been predicted theoretically by Brochard and DeGennes Journal de Physique, 31, (1970) p. 691., and is attributed to a coupling of the magnetic particles with the liquid crystalline aggregates. The practical benefit is that the physical properties of the liquid crystalline system, such as its electrical or optical properties, may be varied with weak magnetic fields, thus enabling application, for example, in optical display devices. In the case of polymeric liquid crystals, it is anticipated that facilitation of orientation in weak magnetic fields will provide a route to reduced viscosity and/or controlled orientation in processing, for example, in injection-molding and in film or fiber extrusion. Control of orientation should result in improved control of the mechanical properties of the solid.

DRAWINGS

The FIGURE represents a wide angle x-ray pattern for polymer containing magnetic particles which has been oriented in a 500 Gauss field.

SUMMARY OF THE INVENTION

The present invention provides a melt-processable composition which is readily oriented in a magnetic field, consisting essentially of an anisotropic melt-forming polymer containing from 0.01 to 1 volume percent of coated magnetic particles dispersed therein, said particles being coated with a dispersant to reduce agglomeration of the particles. It also includes a process for achieving the orientation and the uniaxially oriented product.

DETAILED DESCRIPTION OF THE INVENTION

This invention permits the use of magnetic fields to provide a desired orientation of anisotropic melt-forming polymer crystals in shaped articles at relatively weak field strengths. The composition useful for this invention contains three essential components.

The first essential component is an anistropic melt forming polymer, preferably a polyester. This material is well known in the prior art and is exemplified in U.S. Pat. Nos. 4,118,372, 4,269,965 and many others.

Magnetic particles constituting the second essential component are chosen from the group consisting of ferric oxide $Fe_2O_3$, magnetite $Fe_3O_4$; iron, cobalt, nickel, manganese and their respective alloys, binary and rare earth metal compounds, platinum and rhenium alloy particles and ferrites such as barium, strontium, manganese and zinc ferrites. The particles are preferably of elongated or rod-like shape, having a length of about 0.1 to 1 microns and a length-to-breadth ratio of about 5-10. The particles should also have a Curie temperature above about 300° C. or above the flow or melting temperature of the polymer.

To prevent agglomeration, the particles should be coated with an appropriate dispersant or surface active agent prior to blending with the polymer. The dispersant must be soluble in organic media and capable of covalent, ionic or hydrogen bonding to the magnetic particles. Examples of such dispersants include organosilicones, organotitanates and metal salts such as nickel salts of organic acids such as stearates or oleates. A sufficient amount is present to achieve dispersal of the magnetic particles. The concentration of coated particles in the polymer composition should be sufficient to facilitate orientation of the polymer while the polymer is in molten form. Satisfactory results are obtained when the concentration of the magnetic particles in the liquid crystalline polymer system is about 0.01 to 1 volume %.

The process of this invention involves applying a magnetic field to the novel composition while the polymer is in molten condition to induce uniaxial orientation in the plane of the field. The field strengths employed and time periods for application of the magnetic field will vary depending upon the polymer molecular weight, among other variables. It is useful to apply the field for from about 1 to 10 minutes. In any case, the time-field relationship should be adapted to achieve the level of uniaxial orientation desired. A field strength in the range of from about 50 to 2,000 Gauss has been found useful. The polymer is then cooled or quenched, preferably in the magnetic field, to produce the uniaxially oriented product.

EXAMPLE

A thermotropic linear aromatic copolyester, 1,4-hydroxy-benzoic acid/3,4'-dihydroxy-3'-chlorobenzophonone/terephthalic acid (60/20/20), is prepared by a standard polymerization procedure described in U.S. Pat. No. 4,183,895. This polymer forms an anisotropic melt above its flow temperature of about 290° C.

A dispersion of magnetic iron oxide particles (Hercules B-350, magnetite $Fe_3O_4$ Curie Temperature of 585° C.) having a length of about 0.8 microns and a length-to-breadth ratio of about 6 to 1 coated with an organosilane dispersant (gamma-methacryloxypropyl-trimethoxysilane, Union Carbide A187) was prepared as follows: 5 g of dispersant was first mixed with 15 g water and 130 g methanol. The mixture was then combined with 25 g of iron oxide particles and mechanically mixed in a ball mill type mixer for 2 hr at a stirrer speed of 300 rpm. The mixture was then filtered using a filter and Buchner funnel, washed with 100 g methanol and dried.

1.0 g of the coated iron oxide particles was then mixed with 9.0 g of the copolyester, the latter being in the form of a dry flake. The mixture together with 10 ml of methylene chloride was placed in a ceramic jar filled with stainless steel beads, and the contents rolled for two hours. The copolyester/particle mixture was recovered and was extrusion-blended through an elastic melt mixing extruder (Custom Scientific Instruments, Whippany, NJ) equipped with a ribbon header containing a 15 mil slot orifice. The header temperature was 302° C. The extrudate was then re-extruded twice at the same conditions. The latter extrudate was then ground in a Wiley mill to pass through a 30 mesh screen. 1.0 g of the ground extrudate was mixed with 9.0 g of the copolyester, and the mixture extruded at the same extruder conditions as above. The final extrudate contained about 1% by wt (or 0.3% by volume) of coated magnetic particles.

The final extrudate was then ground into powder, and a sample of the latter was packed in a standard 5 mm NMR (nuclear magnetic resonance) tube. The tube was evacuated, then backfilled with nitrogen at atmospheric pressure, and sealed. The sealed tube was then placed in a magnetic field of 500 Gauss strength, the field direction being normal to the long axis of the tube. The tube was then heated to 320° C. (above the copolyester melting temperature) held at 320° C. for 10 min. in the presence of the magnetic field, and then quenched to room temperature on removal from magnetic field. A thin disc-like section was cut normal to the long axis of the tube, and was examined by wide angle X-ray diffraction. An x-ray pattern with characteristic equatorial scattering expected for an oriented nematic was observed, similar to that found for an oriented fiber of this polymer. The x-ray pattern is presented in the FIG.

For comparison, when another sample of the copolyester composition without magnetic paricles was subjected to the same test, it was found that a magnetic field 14–20 times stronger (7,000–10,000 Gauss) was required to obtain a similar orientation. Using nuclear magnetic resonance (nmr) techniques, orientation rate was found to decrease with decreasing field strength.

For an orientation time of 15 minutes, complete orientation was observed for a field strength of 10,000 Gauss or greater, partial orientation was observed in a 5,000 Gauss field, while at 2,000 Gauss, little or no orientation was observed. Thus, the control sample would be unoriented in fields of 2,000 Gauss or less.

I claim:

1. An improved process for inducing uniaxial polymer orientation in a shaped article of an anisotropic melt-forming polymer comprising applying a magnetic field to a molten composition of an anistropic melt-forming polymer containing from 0.01 to 1 volume percent of coated magnetic particles dispersed therein, said coating comprising a dispersant to reduce agglomeration of the particles and then solidifying the polymer.

2. A process according to claim 1 wherein the polymer is a polyester.

3. A process according to claim 1 wherein the magnetic field strength is in the range of 50 to 2,000 Gauss.

4. A process according to claim 1 wherein the magnetic particles have a length of about 0.1 to 1 microns and a length-to-breadth ratio of about 5 to 10.

5. A novel composition comprising an anisotropic melt forming polymer and from 0.01 to 1 volume percent of coated coated magnetic particles, said particles being coated with a dispersant to reduce agglomeration of the particles.

6. A composition according to claim 5 wherein the polymer is a polyester.

7. A composition according to claim 5 where the magnetic particles have a length of about 0.1 to 1 microns and a length-to-breadth ratio of about 5–10.

8. A composition according to claim 6 wherein the magnetic particles are iron oxide.

9. A uniaxially oriented product comprising an anisotropic melt-forming polymer containing from 0.01 to 1 volume percent of coated magnetic particles.

* * * * *